United States Patent
Arango Moreno

(10) Patent No.: US 8,404,297 B2
(45) Date of Patent: Mar. 26, 2013

(54) PROCESS FOR CO-CRYSTALLIZING SUCROSE AND A NATURAL SWEETENER AND THE PRODUCT THEREOF

(75) Inventor: Diana Maria Arango Moreno, Cali (CO)

(73) Assignee: Ingenio del Cauca S.A.—Incauca S.A., Cali (CO)

( * ) Notice: Subject to any disclaimer, the term of this patent is extended or adjusted under 35 U.S.C. 154(b) by 841 days.

(21) Appl. No.: 12/304,492

(22) PCT Filed: Jun. 13, 2006

(86) PCT No.: PCT/IB2006/001664
§ 371 (c)(1),
(2), (4) Date: Oct. 6, 2009

(87) PCT Pub. No.: WO2007/144683
PCT Pub. Date: Dec. 21, 2007

(65) Prior Publication Data
US 2010/0034945 A1 Feb. 11, 2010

(51) Int. Cl.
*A23L 1/221* (2006.01)
(52) U.S. Cl. ................................................ 426/548
(58) Field of Classification Search .................. 426/548
See application file for complete search history.

(56) References Cited

U.S. PATENT DOCUMENTS

| | | | |
|---|---|---|---|
| 4,362,757 A | 12/1982 | Chen et al. | |
| 4,423,085 A | 12/1983 | Chen et al. | |
| 4,746,520 A | 5/1988 | Smits et al. | |
| 5,779,805 A * | 7/1998 | Morano | 127/42 |
| 5,876,506 A * | 3/1999 | Cherukuri et al. | 127/63 |
| 6,214,402 B1 | 4/2001 | Fotos et al. | |
| 2001/0002271 A1* | 5/2001 | Duffett | 426/285 |

FOREIGN PATENT DOCUMENTS

| | | |
|---|---|---|
| EP | 0052413 | 5/1982 |
| EP | 0219150 | 4/1987 |
| ES | 2207289 | 5/2004 |
| JP | 62220167 | 9/1987 |
| WO | WO96/07331 | 3/1996 |

OTHER PUBLICATIONS

McGee, H. 2004. On Food and Cooking: The Science and Lore of the Kitchen. Scribner: New York. p. 673.*

* cited by examiner

*Primary Examiner* — Nikki H Dees
(74) *Attorney, Agent, or Firm* — The Juhasz Law Firm

(57) ABSTRACT

The invention relates to a preparation process of a co-crystal made of sugar and a natural sweetener and, eventually, another aggregate and with said product. The process is further related with co-crystallizing sucrose and a natural sweetener in a vacuum pan under controlled pressure and temperature conditions and separating the crystal from the sugar juice.

At the end of the process, the co-crystallized sub-products are used for producing a low calorie content liquid sweetener such that in a high percentage all the stock material is used.

9 Claims, 2 Drawing Sheets

US 8,404,297 B2

PROCESS FOR CO-CRYSTALLIZING SUCROSE AND A NATURAL SWEETENER AND THE PRODUCT THEREOF

FIELD OF THE INVENTION

The present disclosure is related with the field of crystallization of sweetening products and more specifically, with co-crystallizing sugar and another natural sourced sweetener.

BACKGROUND

U.S. Pat. No. 6,214,402, describes a co-crystallization process between sugar and N-{N-(3,3-dimethylbutyl)-L-alpha-aspartyl}-L-phenylalanine I-methylester. This disclosure is addressed to a method for preparing co-crystallized sugar comprising the steps of mixing sugar with water with stifling, heating the mixture to 120° C., seeding the mixture with a pre-mixture comprising N-{N-(3,3-dimethylbutyl)-L-alpha-aspartyl}L-phenylalanine I-methylester and sugar, removing the mixture from heat and allowing it to cool along with vigorous stirring.

In connection with the state of the art documents, it is important to mention the existing differences. In said document U.S. Pat. No. 6,214,402 the sugar and neotame co-crystallization process was carried out under atmospheric pressure conditions, that is, at high temperatures, in this specific case at 120° C. In the case of the present disclosure, the product is obtained under vacuum pressure, 60 KPa-75 KPa, which corresponds to an operative temperature of 60° C.-75° C. In the latter case, the darkening of the mother liquor is significantly diminished, which darkening is promoted by high temperatures, which enhances the color of the final product.

On the other hand, in the co-crystallization process of sugar and neotame, the seeding is carried out with the mixture of sugar and neotame being in the oversaturation zone, thus producing a shock seeding, which generates a non-homogeneous crystal distribution at the end of the process. In the co-crystallization process of the present disclosure, the natural sweetener is fed after loading the batch foot in the equipment and this mixture is evaporated until saturation point is reached wherein an amount of powdered sugar and isopropyl alcohol suspension is added. The advantage of this methodology is that the added crystals in the seed, would be those that will be obtained at the end of the process having a homogeneous size and therefore having a lesser size variation coefficient.

Furthermore, no reference is made to separating the crystals of sugar juice or syrup in the patent for the sugar and neotame co-crystallization; a necessary operation for the obtention of a free-flowing granular product, that do not become compacted or compressed.

In the co-crystallization process of a preferred embodiment of the present disclosure, a starting liquor or syrup may have a brix of 55°, and may come from a white sugar melting, clearing, bleaching and filtering process, which generates a stock material having a better quality. U.S. Pat. No. 6,214,402, discloses a sugar and water mixture having 67° brix, with no previous treatment that improves or changes the characteristics of the solution.

Finally, the present disclosure uses natural sweeteners and, besides, there is the possibility of adding some other aggregate which gives a special characteristic to said product.

U.S. Pat. No. 4,362,757 describes a sugar crystallized product containing a heat sensitive substance, an acid substance or an inverted sugar. This crystallized sugar product is dry, granular, free flowing that does not become compact and is dispersible in water. The crystallized sugar products are formed in two steps: preparation of a sugar pre-mixture which is dry, granular or transformed with a heat sensitive substance, an inverted sugar or an acid, then it is crystallized through the concentration of the sugar syrup, adding a determined amount of pre-mixture and subjecting the mixture to impact.

The present disclosure has notable advantages over the U.S. Pat. No. 4,362,757, because in the latter the work is done at a high temperature between 124 and 149° C. (255 and 300° F.), which increases the solubility of sucrose in water, causing the oversaturation of 95-98% of solids. In the present disclosure, the maximum operative temperature is 75° C. and its saturation step is reached in a percentage of solids between 79-81%. The process conditions have a direct impact on the final product. The present disclosure radically improves the size distribution of the sugar crystal. The present disclosure decreases the effect of temperature on the color of the final sugar and on the sugar juice or syrup resulting from the centrifugation process. The present disclosure improves the homogeneity of the natural sweetener and the aggregate in this case, due to the fact that the crystallization is carried out under a controlled and regulated manner, thereby avoiding oversaturation that leads to the generation of new sucrose crystals that do not contain the sweetener or the aggregate. This control and regulation of the temperature is done through vacuum in the equipment and constant conditions of heat through water steam. In the mentioned US patent the oversaturation is controlled by removing the heat through water jackets or forced air flow, instead where the process can go out of control.

SUMMARY OF THE DISCLOSURE

The present disclosure relates to a new product formed by sugar which is co-crystallized along with other natural sweetener product and, optionally, another aggregate, said product has 100% homogeneity, increases the sweetening power by one and a half and fifty folds when compared to that of sugar and, furthermore, being a natural product it does not cause any harmful effects on the organism. In addition, the obtained sub-product in the centrifuging process is useful by obtaining a low calorie liquid sweetener.

The disclosure is addressed to the preparation process of a sugar and a natural sweetener co-crystal and, optionally, another aggregate and to said product. The process is related with co-crystallization of sucrose with a natural sweetener in a vacuum pan under controlled pressure and temperature conditions and with the separation of the crystals from the sugar juice.

At the end of the process the sub-product of the co-crystallization is used for producing a liquid sweetener having low calorie content such that a high percent of the stock material is used.

BRIEF DESCRIPTION OF THE DRAWINGS

In order to have greater clearness and understanding of the disclosure, the following figures illustrate a co-crystallization process in which.

DETAILED DESCRIPTION

The present description will use the terms in the sense defined as follows:

Light liquor: that obtained after melting a white sugar and has been subjected to clarification, bleaching with active carbon and filtration processes.

Cooked mass: Mixture of sugar and mother liquor unloaded from the vacuum pan, which comprises syrup and co-crystals of sucrose and natural sweetener.

Co-crystallized sugar: is a sugar obtained through co-crystallization of sucrose with natural sweetener.

Syrup: is the sugar juice obtained in the centrifugation and washing process of the cooked mass.

Batch foot: is the amount of light liquor and/or syrup enough for covering the calandria of the vacuum pan at the beginning of the batch.

Brix: Concentration unit equivalent to the percentage by weight of soluble solids containing a solution.

Vacuum pan: simple effect evaporation unit that operates under vacuum and which consists of a steam driven heating system, a cylinder-shaped body for cooking the mass. Feed tubing, condensates and incondensable gases output, valves and control instruments, dragging separator and condenser.

Natural sweetener: Product of natural source such as stevia, cactus pier fruit (*Opuntia ficus*, indica L), Calonil (from the fruit of *Mormordica grosvenori*), taumatine (from the *Thaumatococcus daniellii*), corn derivatives and others.

Stevia: extract from the leave of the *Stevia rebaudiana*, Bertoni, which contains glycosides Stevioles as active principle (Steviosides, Rebaudioside A, Rebaudioside C and dulcoside A).

Batch: A batch of cooked mass.

Co-Crystallization Process

The co-crystallization process of sugar with a natural sweetener and, optionally, an aggregate that grants some special characteristic to the product, has as important characteristics obtaining a homogeneous, granular, free flowing, non-compactable product which sweetening power is between one and a half to fifty times that of sucrose, thus decreasing the calorie content per ration; in addition, it is a natural product that do not produce any deleterious effect to the human organism.

Figure 1:
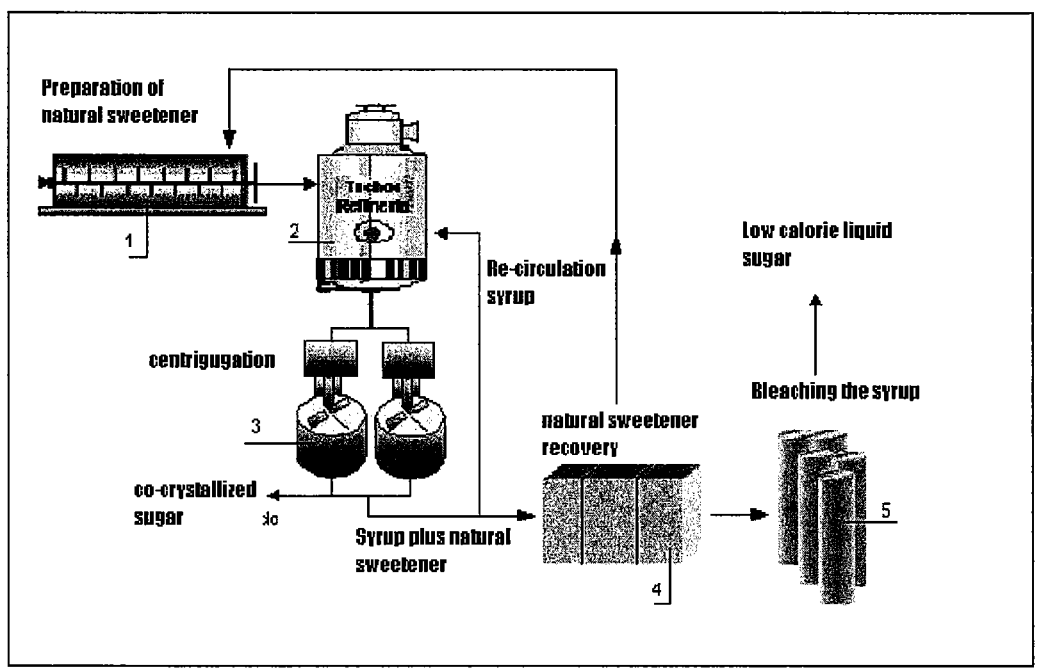
FIG. 1 schematically shows a process in which sugar and a natural sweetener are co-crystallized for producing the co-crystal of the present disclosure and the utilization of the sub-product as a liquid natural sweetener.

In FIG. 1, reference number 1 corresponds to the equipment wherein the natural sweetener extract is obtained, optionally, mixed with an aggregate. Reference number 2 shows the vacuum pan wherein the liquor is loaded, an antifoaming agent and the prepared extract are added, under continuous mixing, the mixture is concentrated up to the range between 79° and 81° brix. At this point, the mixture is seeded with the alcoholic suspension and once the crystals are generated the liquor is slowly fed until 100% level is reached with 88° to 91° brix.

The product obtained in 2 (cooked mass) is centrifuged in the equipment identified with numeral 3. Herein, sugar co-crystallized with natural sweetener and, optionally, an aggregate is produced. Furthermore, a syrup sub-product with the natural sweetener is re-circulated as shown in reference number 2 in order to restart the co-crystallization process. This process is repeated until the syrup color complies with the specifications because during the repetition of this process said syrup tends to become darker.

When the syrup falls out of the specifications due to repeated and successive cocrystallization processes (i.e., the color of the re-circulated syrup is found above 1600 UI-1800 UI), then the process continues with recovering the greater amount of the natural sweetener, taking into account its solubility in order to use the adequate solvent. This step occurs in reference number 4.

The recovered natural sweetener returns to the equipment identified in 1 wherein said sweetener is obtained and then the process restarts.

The non-recovered syrup with natural sweetener is further treated in a bleaching step in order to, afterwards, obtain a liquid sweetener product having also low calories.

Finally, the crystallization process of the present disclosure comprises the following steps:

Adding an antifoaming agent to the liquor or syrup (batch foot) in order to avoid the foam provoked by the natural sweetener in a percentage of 0.006% to 10% (w/w) to form a sucrose solution;

Mixing with mechanical stifling the sucrose solution (light liquor or syrup) with while adding 0.1% to 50% w/w of natural sweetener with respect to the amount of produced mass and, optionally, adding an aggregate in order to reach any special characteristic, to form a mixture;

Concentrating the above mixture up to saturation point of sucrose, 79° to 81° brix, in a vacuum pan at a working pressure of 60 KPa to 75 KPa and a temperature between 60° C. to 75° C. to form a concentrate;

Adding a powdered sugar suspended in isopropyl alcohol to the concentrate, which is then used as seed for crystallizing the previous solution in the saturation zone. The amount is determined by different variables such as the weight of the crystal in the mass, the initial size of the seed and the desired final size; which relate in the following manner:

$$\text{Suspension weight} = \text{crystal weight in mass} * ((\text{initial size/final size})^3);$$

Feeding the light liquor or syrup in a constant and slow manner into a sugar evaporator, maintaining the crystallized solution in the "meta-stable zone", in order to avoid the spontaneous generation of new crystals or dilution of those previously formed. This step is carried out until the equipment reaches 100% of its level, wherein the co-crystallized sucrose and natural sweetener crystal has reached a size of 0.5 to 0.7 mm average aperture;

evaporating the remaining water from the resulting suspension until reaching 88° and 91° Bx;

unloading the resulting evaporated mass in order to carry out the separation of the crystals from the sugar juice or syrup through centrifuging at a velocity between 1100 and 1300 rpm to form a supernatant comprising the sugar juice or syrup and residual uncrystallized natural sweetener product and a pellet comprising the co-crystals;

re-circulating a portion of the obtained supernatant at the end of the co-crystallization process (centrifuging) as necessary while it does not loose the color established by the product specifications;

recovering from a second portion of the supernatant between 1 and 90% of the natural sweetener with a solvent in which said natural sweetener is soluble;

Bleaching the remaining syrup and natural sweetener mixture, with a bleaching product and obtaining a low calorie liquid product, containing between 15-60% sucrose, 0.01-8% natural sweetener and 40-85% water, which has a sweetening power between 1.2 and 10 times higher than that of sugar.

Antifoaming substances that can be used with this disclosure are any of the following compounds: PROPEG DF 7990 M2 (produced by Protecnica Ingenieria S.A.), INTRASOL FK 35 (produced by Lipesa Colombia S.A.), Indol CS-100 (produced by Nopco Colombiana S.A.), Lipesa 9103 (produced by Lipesa Colombia), and Rhodorsil 70462 (Produced by Emulsiones Quimicas Ltda.).

The natural sweetener used in this disclosure can be chosen among: stevia, Cactus pier fruit (*Opuntia ficus*, Indica L), Calonil (from the fruit of *Mormordica grosvenori*), Taumatine (from *Thaumatococcus daniellii*), honey, sucralose, glucose, fructose, corn derivatives, lactose, polyols (sorbitol, Mannitol, Xilitol), Glycirine, Taumatine, Tagatose, Filodulcine, Osladine, Moneline and others. The most preferred being stevia.

Optionally, an aggregate is added in order to obtain any special characteristic such as flavor or any nutritive property. Said aggregate can be comprised by: calcium, citric acid, vitamins, fiber, minerals, herb extracts, etc.

The present disclosure is also related to the sucrose and stevia co-crystal. Said cocrystal is characterized in that it comprises sugar, a natural sweetener and, optionally, an aggregate which give it special characteristics, and which is obtained through the above described process.

The natural sweetener used in the crystal can be chosen among: stevia, polyols, Cactus pier fruit (*Opuntia ficus*, Indica L), Calonil (from the fruit of *Mormordica grosvenori*), Taumatine (from *Thaumatococcus daniellii*). In particular, stevia is preferred.

Said co-crystal can use some aggregates such as: calcium, citric acid, vitamins, fiber, minerals, herb extracts. Furthermore, said co-crystal has a size around 0.5-0.7 mm, preferably, 0.6 mm.

This co-crystal has different applications in different fields such as: bakery, ice cream manufacturing, confectionery, carbonated beverages, coffees, teas, juice making, flavored water, energizing beverages, alcoholic beverages, lactic beverages, sodas.

Said co-crystal bears a sweetening power between one and a half to fifty times that of plain sugar. Preferably said sweetening power is two times.

Finally, this disclosure is also related with a sub-product obtained from the other portion of syrup mixed with 20-40% of the initial natural sweetener which is bleached with activated carbon and then mixed with water. This product is 1.2 to 10 times sweeter than sugar. Preferably 1.2 to 3 times and contains between 1-4 calories per gram, preferably between 1 and 2 calories per gram.

Figure 2:
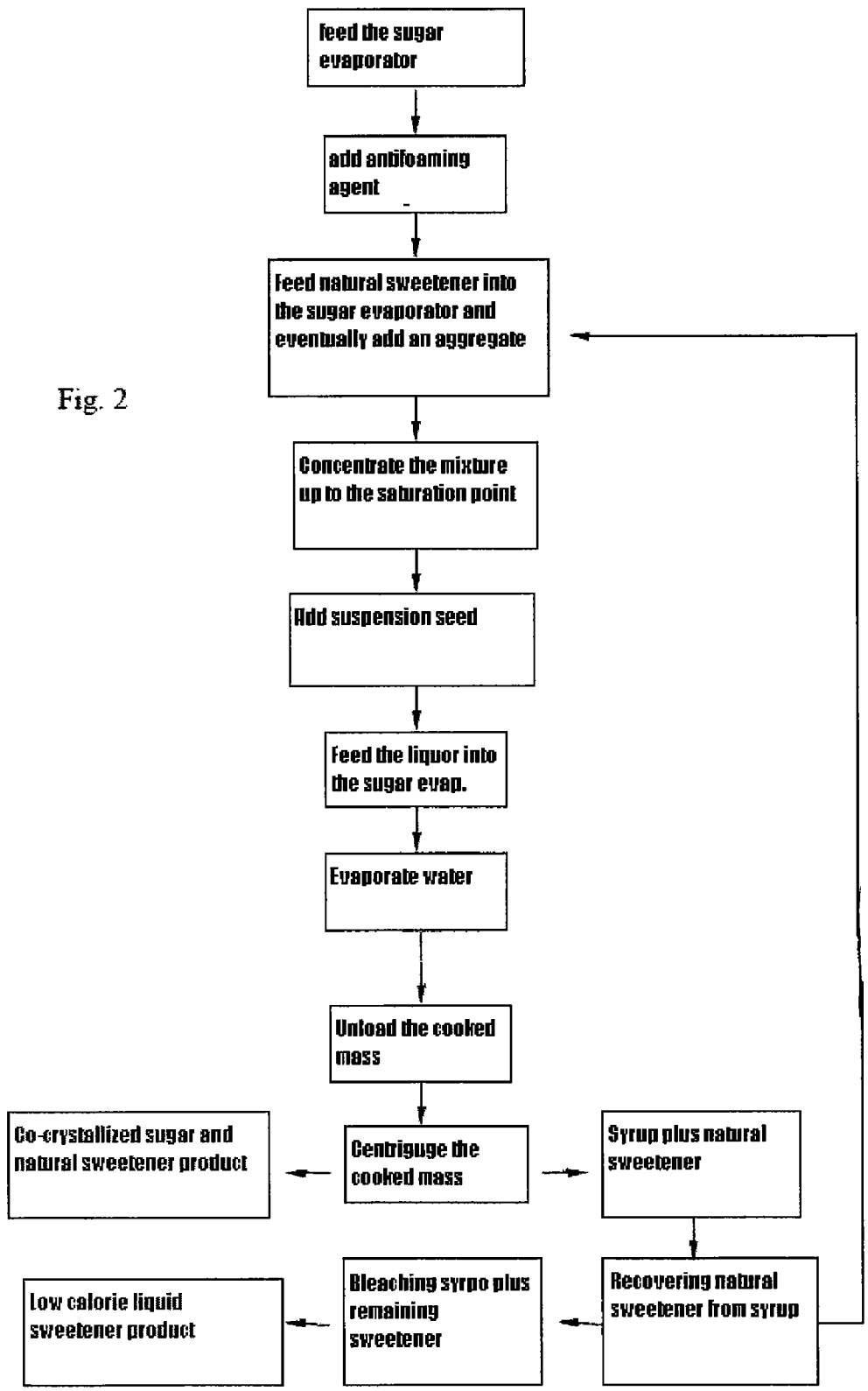
FIG. 2 shows a flow chart of a co-crystallization process according to some embodiments of the disclosure.

FIG. 2 shows the flow diagram of the above explained crystallization process and that is submitted for additionally making clear the process of the present disclosure.

EXAMPLE

2% of stevia is added to the liquor previously fed and mixed with 0.1% of antifoaming. This new mixture is concentrated up to 80° Bx and then 20 ml of suspension is added. After the generation of the crystals liquor is fed until 100% level and an 89% brix are reached. This mass is centrifuged at 1200 rpm. The result is a white color product of co-crystallized sugar and stevia. The approximate proportion of sugar with respect to stevia is around 99.6% to 0.4%. Its sweetening power is, around, two times that of only sugar. The resulting syrup coming from the centrifugation is mixed with ethylic alcohol and 80% of the initial stevia is recovered, which is then re-circulated. The other portion of the syrup mixed with 20% of the initial stevia, is bleached with ionic interchange resin and afterwards is mixed with water. This product is 1.6 times sweeter than sugar and contains 2 calories per gram.

We claim:

1. A process for co-crystallizing sugar with a natural sweetener product, the process comprising:
    adding an antifoaming agent in a percentage of about 0.006% to about 10% (w/w) to a liquor or syrup to form a sucrose solution;
    mixing the sucrose solution with mechanical stirring while adding 0.1% to 50% w/w of natural sweetener product to form a mixture;
    concentrating the mixture up to the saturation point of sucrose, in a vacuum pan at a working pressure of about 60 KPa to about 75 KPa and a temperature between about 60° C. to about 75° C. to form a concentrate;
    adding a powdered sugar suspended in isopropyl alcohol to the concentrate under conditions which permit co-crystallization of the sugar and the natural sweetener product and wherein a seed co-crystal suspension is produced;
    feeding the seed co-crystal suspension into a sugar evaporator under conditions that maintain the co-crystal suspension in the "meta-stable zone" until the co-crystallized sucrose and natural sweetener crystal has reached a size of about 0.5 to about 0.7 mm average aperture to form a final co-crystal suspension;
    evaporating remaining water from the final co-crystal suspension until reaching an evaporated mass having between about 88° and about 91° Bx;
    separating the co-crystals from the suspension by centrifuging the evaporated mass at a velocity between about 1100 and about 1300 rpm to form a supernatant comprising syrup and residual uncrystallized natural sweetener product and a pellet comprising the co-crystals;
    re-circulating a first portion of the supernatant, wherein the re-circulated portion has a color from about 1300 and about 1600 UI;
    contacting a second portion of the supernatant with a solvent in which the natural sweetener product is soluble to recover from about 1 and about 90% of the natural sweetener product; and
    bleaching the second portion of the supernatant following the recovery of the natural sweetener product to obtain an amount of a low calorie liquid product.

2. A process for co-crystallizing sugar with a natural sweetener product according to claim 1, wherein the natural sweetener product is selected from the group consisting of stevia, an *Opuntia ficus*-indica L. cactus pear fruit extract, a *Momordica grosvenori* fruit sweetener, thaumatin, and combinations thereof.

3. A process for co-crystallizing sugar with a natural sweetener product according to claim 1, wherein the natural sweetener is stevia.

4. A process for co-crystallizing sugar with a natural sweetener product according to claim 1 further comprising adding to the sucrose solution an aggregate.

5. A process for co-crystallizing sugar with a natural sweetener product according to claim 4, wherein the aggregate is selected from the group consisting of calcium, citric acid, a vitamin, fiber, a mineral, an herb extract, and combinations thereof.

6. A process for co-crystallizing sugar with a natural sweetener product according to claim 1, wherein the amount of powdered sugar added is calculated according to formula I $$W_{PSS} = W_C * ((S_f / S_i)^3) \quad \text{(I)},$$

wherein
    $W_{PSS}$ is the weight of powdered sugar/isopropyl alcohol suspension to be added,
    $W_C$ is the crystal weight in the powdered sugar suspension, $S_i$ is the size of the crystals in the powdered sugar suspension, and $S_f$ is the final size of the co-crystal.

7. A process for co-crystallizing sugar with a natural sweetener product according to claim 1, wherein the size of the co-crystals is about 0.7 mm.

8. A process for co-crystallizing sugar with a natural sweetener product according to claim 1, wherein the size of the co-crystals is about 0.6 mm.

9. A process for co-crystallizing sugar with a natural sweetener product according to claim 1, wherein bleaching the third portion of the supernatant sugar juice or syrup comprises contacting the third portion of the supernatant sugar juice or syrup with an activated carbon or ion interchange resin.

* * * * *